(12) United States Patent
Line et al.

(10) Patent No.: US 9,096,157 B2
(45) Date of Patent: Aug. 4, 2015

(54) SEATING ASSEMBLY WITH AIR DISTRIBUTION SYSTEM

(71) Applicant: Ford Global Technologies, LLC, Dearborn, MI (US)

(72) Inventors: Johnathan Andrew Line, Northville, MI (US); Paul Bryan Hoke, Plymouth, MI (US); Michael Kolich, Windsor (CA); John W. Jaranson, Dearborn, MI (US); Marc Kondrad, Macomb Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 157 days.

(21) Appl. No.: 13/749,595

(22) Filed: Jan. 24, 2013

(65) Prior Publication Data
US 2014/0203599 A1 Jul. 24, 2014

(51) Int. Cl.
*B60N 2/60* (2006.01)
*B60N 2/72* (2006.01)
*B60N 2/56* (2006.01)
*B60N 2/64* (2006.01)

(52) U.S. Cl.
CPC .............. *B60N 2/5642* (2013.01); *B60N 2/565* (2013.01); *B60N 2/6009* (2013.01); *B60N 2/643* (2013.01); *B60N 2/72* (2013.01); *B60N 2205/30* (2013.01)

(58) Field of Classification Search
USPC ............. 297/180.13, 180.14, 230.12, 230.13, 297/452.34, 452.36, 452.38, 354.11
See application file for complete search history.

(56) References Cited

U.S. PATENT DOCUMENTS

| 2,958,369 | A | 11/1960 | Pitts et al. |
| 3,403,938 | A | 10/1968 | Cramer et al. |
| 3,929,374 | A | 12/1975 | Hogan et al. |
| 4,324,431 | A | 4/1982 | Murphy et al. |
| 4,334,709 | A | 6/1982 | Akiyama et al. |
| 4,353,595 | A | 10/1982 | Kaneko et al. |

(Continued)

FOREIGN PATENT DOCUMENTS

| EP | 0754590 | 1/1997 |
| EP | 0926969 | 1/2002 |

(Continued)

OTHER PUBLICATIONS

M. Grujicic et al., "Seat-cushion and soft-tissue material modeling and a finite element investigation of the seating comfort for passenger-vehicle occupants," Materials and Design 30 (2009) 4273-4285.

(Continued)

*Primary Examiner* — David R Dunn
*Assistant Examiner* — Timothy J Brindley
(74) *Attorney, Agent, or Firm* — Vichit Chea; Price Heneveld LLP (57) ABSTRACT

A vehicle seating assembly with a cooling system includes a seatback structure with a permeable passenger support which is coupled with the seatback structure. The passenger support has a back support surface and a rear surface. A concave shell has a peripheral edge which is coupled with the rear surface of the passenger support. A conduit member has an intake opening between the passenger support and the shell and an exhaust opening. An air chamber is coupled with the exhaust opening of the conduit member and has a fan on an exterior portion of the air chamber to draw air from the back support surface through the air chamber.

20 Claims, 6 Drawing Sheets

(56) References Cited

U.S. PATENT DOCUMENTS

| | | |
|---|---|---|
| 4,541,669 A | 9/1985 | Goldner |
| 4,629,248 A | 12/1986 | Mawbey |
| 4,720,141 A | 1/1988 | Sakamoto et al. |
| 4,915,447 A | 4/1990 | Shovar |
| 5,171,062 A | 12/1992 | Courtois |
| 5,174,526 A | 12/1992 | Kanigowski |
| 5,518,294 A | 5/1996 | Ligon, Sr. et al. |
| 5,560,681 A | 10/1996 | Dixon et al. |
| 5,647,635 A | 7/1997 | Aumond et al. |
| 5,755,493 A | 5/1998 | Kodaverdian |
| 5,769,489 A | 6/1998 | Dellanno |
| 5,826,938 A | 10/1998 | Yanase et al. |
| 5,836,648 A | 11/1998 | Karschin et al. |
| 5,902,014 A | 5/1999 | Dinkel et al. |
| 5,913,568 A | 6/1999 | Brightbill et al. |
| 5,951,039 A | 9/1999 | Severinski et al. |
| 6,024,406 A | 2/2000 | Charras et al. |
| 6,062,642 A | 5/2000 | Sinnhuber et al. |
| 6,145,925 A | 11/2000 | Eksin et al. |
| 6,155,593 A | 12/2000 | Kimura et al. |
| 6,179,379 B1 | 1/2001 | Andersson |
| 6,189,966 B1 | 2/2001 | Faust et al. |
| 6,196,627 B1 | 3/2001 | Faust et al. |
| 6,206,466 B1 | 3/2001 | Komatsu |
| 6,217,062 B1 | 4/2001 | Breyvogel et al. |
| 6,220,661 B1 | 4/2001 | Peterson |
| 6,224,150 B1 | 5/2001 | Eksin et al. |
| 6,296,308 B1 | 10/2001 | Cosentino et al. |
| 6,312,050 B1 | 11/2001 | Eklind |
| 6,364,414 B1 | 4/2002 | Specht |
| 6,375,269 B1 | 4/2002 | Maeda et al. |
| 6,394,546 B1 | 5/2002 | Knoblock et al. |
| 6,454,353 B1 | 9/2002 | Knaus |
| 6,523,892 B1 | 2/2003 | Kage et al. |
| 6,550,856 B1 | 4/2003 | Ganser et al. |
| 6,565,150 B2 | 5/2003 | Fischer et al. |
| 6,619,605 B2 | 9/2003 | Lambert |
| 6,619,737 B2 * | 9/2003 | Kunkel et al. ............ 297/180.14 |
| 6,682,140 B2 | 1/2004 | Minuth et al. |
| 6,695,406 B2 | 2/2004 | Plant |
| 6,698,832 B2 | 3/2004 | Boudinot |
| 6,736,452 B2 | 5/2004 | Aoki et al. |
| 6,758,522 B2 | 7/2004 | Ligon, Sr. et al. |
| 6,808,230 B2 | 10/2004 | Buss et al. |
| 6,824,212 B2 | 11/2004 | Malsch et al. |
| 6,848,742 B1 | 2/2005 | Aoki et al. |
| 6,860,559 B2 | 3/2005 | Schuster, Sr. et al. |
| 6,860,564 B2 | 3/2005 | Reed et al. |
| 6,866,339 B2 | 3/2005 | Itoh |
| 6,869,140 B2 | 3/2005 | White et al. |
| 6,890,029 B2 | 5/2005 | Svantesson |
| 6,938,953 B2 | 9/2005 | Håland et al. |
| 6,955,399 B2 | 10/2005 | Hong |
| 6,962,392 B2 | 11/2005 | O'Connor |
| 6,988,770 B2 | 1/2006 | Witchie |
| 6,997,473 B2 | 2/2006 | Tanase et al. |
| 7,040,699 B2 | 5/2006 | Curran et al. |
| 7,100,992 B2 | 9/2006 | Bargheer et al. |
| 7,131,694 B1 | 11/2006 | Buffa |
| 7,159,934 B2 | 1/2007 | Farquhar et al. |
| 7,185,950 B2 | 3/2007 | Pettersson et al. |
| 7,213,876 B2 | 5/2007 | Stoewe |
| 7,229,118 B2 | 6/2007 | Saberan et al. |
| 7,261,371 B2 | 8/2007 | Thunissen et al. |
| 7,344,189 B2 | 3/2008 | Reed et al. |
| 7,350,859 B2 | 4/2008 | Klukowski |
| 7,393,005 B2 | 7/2008 | Inazu et al. |
| 7,425,034 B2 | 9/2008 | Bajic et al. |
| 7,441,838 B2 | 10/2008 | Patwardhan |
| 7,467,823 B2 | 12/2008 | Hartwich |
| 7,478,869 B2 | 1/2009 | Lazanja et al. |
| 7,506,924 B2 | 3/2009 | Bargheer et al. |
| 7,506,938 B2 | 3/2009 | Brennan et al. |
| 7,530,633 B2 | 5/2009 | Yokota et al. |
| 7,543,888 B2 | 6/2009 | Kuno |
| 7,578,552 B2 | 8/2009 | Bajic et al. |
| 7,597,398 B2 | 10/2009 | Lindsay |
| 7,614,693 B2 | 11/2009 | Ito |
| 7,641,281 B2 | 1/2010 | Grimm |
| 7,669,928 B2 | 3/2010 | Snyder |
| 7,712,833 B2 | 5/2010 | Ueda |
| 7,717,459 B2 | 5/2010 | Bostrom et al. |
| 7,726,733 B2 | 6/2010 | Balser et al. |
| 7,735,932 B2 | 6/2010 | Lazanja et al. |
| 7,753,451 B2 | 7/2010 | Maebert et al. |
| 7,775,602 B2 | 8/2010 | Lazanja et al. |
| 7,784,863 B2 | 8/2010 | Fallen |
| 7,802,843 B2 | 9/2010 | Andersson et al. |
| 7,819,470 B2 | 10/2010 | Humer et al. |
| 7,823,971 B2 | 11/2010 | Humer et al. |
| 7,845,729 B2 | 12/2010 | Yamada et al. |
| 7,857,381 B2 | 12/2010 | Humer et al. |
| 7,862,113 B2 * | 1/2011 | Knoll ...................... 297/180.14 |
| 7,871,126 B2 | 1/2011 | Becker et al. |
| 7,891,701 B2 | 2/2011 | Tracht et al. |
| 7,909,360 B2 | 3/2011 | Marriott et al. |
| 7,931,294 B2 | 4/2011 | Okada et al. |
| 7,931,330 B2 * | 4/2011 | Itou et al. ................. 297/180.14 |
| 7,946,649 B2 | 5/2011 | Galbreath et al. |
| 7,963,553 B2 | 6/2011 | Huynh et al. |
| 7,963,595 B2 | 6/2011 | Ito et al. |
| 7,963,600 B2 | 6/2011 | Alexander et al. |
| 7,971,931 B2 | 7/2011 | Lazanja et al. |
| 7,971,937 B2 | 7/2011 | Ishii et al. |
| 8,011,726 B2 | 9/2011 | Omori et al. |
| 8,016,355 B2 | 9/2011 | Ito et al. |
| 8,029,055 B2 | 10/2011 | Hartlaub |
| 8,038,222 B2 | 10/2011 | Lein et al. |
| 8,075,053 B2 | 12/2011 | Tracht et al. |
| 8,109,569 B2 | 2/2012 | Mitchell |
| 8,123,246 B2 | 2/2012 | Gilbert et al. |
| 8,128,167 B2 | 3/2012 | Zhong et al. |
| 8,162,391 B2 | 4/2012 | Lazanja et al. |
| 8,162,397 B2 | 4/2012 | Booth et al. |
| 8,167,370 B2 | 5/2012 | Arakawa et al. |
| 8,210,568 B2 | 7/2012 | Ryden et al. |
| 8,210,605 B2 | 7/2012 | Hough et al. |
| 8,210,611 B2 | 7/2012 | Aldrich et al. |
| 8,226,165 B2 | 7/2012 | Mizoi |
| 2004/0195870 A1 | 10/2004 | Bohlender et al. |
| 2005/0200166 A1 | 9/2005 | Noh |
| 2006/0043777 A1 | 3/2006 | Friedman et al. |
| 2006/0152062 A1 * | 7/2006 | Archambault et al. .. 297/452.34 |
| 2007/0120401 A1 | 5/2007 | Minuth et al. |
| 2008/0174159 A1 | 7/2008 | Kojima et al. |
| 2009/0066122 A1 | 3/2009 | Minuth et al. |
| 2009/0322124 A1 | 12/2009 | Barkow et al. |
| 2010/0038937 A1 | 2/2010 | Andersson et al. |
| 2010/0140986 A1 | 6/2010 | Sawada |
| 2010/0187881 A1 | 7/2010 | Fujita et al. |
| 2010/0201167 A1 | 8/2010 | Wieclawski |
| 2010/0231013 A1 | 9/2010 | Schlenker |
| 2010/0270840 A1 | 10/2010 | Tanaka et al. |
| 2010/0301650 A1 | 12/2010 | Hong |
| 2010/0320816 A1 | 12/2010 | Michalak |
| 2011/0018498 A1 | 1/2011 | Soar |
| 2011/0074185 A1 | 3/2011 | Nakaya et al. |
| 2011/0095513 A1 | 4/2011 | Tracht et al. |
| 2011/0095578 A1 | 4/2011 | Festag |
| 2011/0109127 A1 | 5/2011 | Park et al. |
| 2011/0109128 A1 | 5/2011 | Axakov et al. |
| 2011/0133525 A1 | 6/2011 | Oota |
| 2011/0163574 A1 | 7/2011 | Tame et al. |
| 2011/0163583 A1 | 7/2011 | Zhong et al. |
| 2011/0186560 A1 | 8/2011 | Kennedy et al. |
| 2011/0187174 A1 | 8/2011 | Tscherbner |
| 2011/0254335 A1 | 10/2011 | Pradier et al. |
| 2011/0260506 A1 | 10/2011 | Kuno |
| 2011/0260509 A1 * | 10/2011 | Siu ......................... 297/180.14 |
| 2011/0272548 A1 | 11/2011 | Rudkowski et al. |
| 2011/0272978 A1 | 11/2011 | Nitsuma |
| 2011/0278885 A1 | 11/2011 | Procter et al. |
| 2011/0278886 A1 | 11/2011 | Nitsuma |
| 2011/0298261 A1 | 12/2011 | Holt et al. |

(56) References Cited

U.S. PATENT DOCUMENTS

| | | |
|---|---|---|
| 2012/0063081 A1 | 3/2012 | Grunwald |
| 2012/0080914 A1 | 4/2012 | Wang |
| 2012/0091695 A1 | 4/2012 | Richez et al. |
| 2012/0091766 A1 | 4/2012 | Yamaki et al. |
| 2012/0091779 A1 | 4/2012 | Chang et al. |
| 2012/0109468 A1 | 5/2012 | Baumann et al. |
| 2012/0125959 A1 | 5/2012 | Kucera |
| 2012/0127643 A1 | 5/2012 | Mitchell |
| 2012/0129440 A1 | 5/2012 | Kitaguchi et al. |
| 2012/0162891 A1 | 6/2012 | Tranchina et al. |
| 2012/0175924 A1 | 7/2012 | Festag et al. |
| 2012/0187729 A1 | 7/2012 | Fukawatase et al. |
| 2012/0248833 A1 | 10/2012 | Hontz et al. |
| 2012/0261974 A1 | 10/2012 | Yoshizawa et al. |

FOREIGN PATENT DOCUMENTS

| | | |
|---|---|---|
| EP | 1266794 | 3/2004 |
| EP | 1123834 | 10/2004 |
| EP | 1050429 | 10/2005 |
| EP | 1084901 | 6/2006 |
| EP | 1674333 | 8/2007 |
| EP | 1950085 | 12/2008 |
| EP | 1329356 | 11/2009 |
| WO | WO9511818 | 5/1995 |
| WO | WO9958022 | 11/1999 |
| WO | WO2006131189 | 12/2006 |
| WO | WO2007028015 | 8/2007 |
| WO | WO2008073285 | 6/2008 |
| WO | WO2011021952 | 2/2011 |
| WO | WO2012008904 | 1/2012 |

OTHER PUBLICATIONS

"Thigh Support for Tall Drivers," http://cars.about.com/od/infiniti/ig/2009-Infiniti-G37-Coupe-pics/2008-G37-cpe-thigh-support.htm (1 page).

Mladenov, "Opel Insignia Receives Seal of Approval for Ergonomic Seats," Published Aug. 27, 2008, http://www.automobilesreview.com/auto-news/opel-insignia-receives-seal-of-approval-for-ergonomic-seats/4169/ (2 pages).

Brose India Automotive Systems, "Adaptive Sensor Controlled Headrest," http://www.indiamart.com/broseindiaautomotivesystems/products.html, Oct. 9, 2012 (12 pages).

eCOUSTICS.com, "Cineak Motorized Articulating Headrest Preview," http://www.ecoustics.com/ah/reviews/furniture/accessories/cineak-motorized-headrest, Oct. 9, 2012 (3 pages).

"'Performance' Car Seat Eliminates Steel," Published in Plastics News—Indian Edition Plastics & Polymer News, (http://www.plasticsinfomart.com/performance-car-seat-eliminates-steel/), Jan. 2012, 3 pages.

"Frankfurt 2009 Trend—Light and Layered." by Hannah Macmurray, Published in GreenCarDesign, (http://www.greencardesign.com/site/trends/00138-frankfurt-2009-trend-light-and-layered), Sep. 2009, 9 pages.

* cited by examiner

SEATING ASSEMBLY WITH AIR DISTRIBUTION SYSTEM

FIELD OF THE INVENTION

The present invention generally relates to an air distribution system for a seating assembly and more particularly to an air distribution system for a vehicle seatback assembly.

BACKGROUND OF THE INVENTION

Seating assemblies for vehicles are increasingly becoming more adapted for occupant comfort in a variety of vehicle environments and for a number of driver and passenger preferences. For instance, temperature adjustment components are more frequently being included in vehicle seating assemblies to adjust the temperature of the occupant support surface. Many of these temperature adjustment components are embedded in a dense foam structure of the vehicle seat cushions to conductively transfer heat between the occupant and the temperature control components. As modern vehicle seating improves ergonomic support and temperature controls, air circulation and ventilation between the seated occupants and the seating assemblies is progressively developing to be more important.

SUMMARY OF THE INVENTION

According to one aspect of the present invention, a vehicle air distribution assembly includes a permeable passenger support that is coupled with a seatback structure. The passenger support has a back support surface and a rear surface. A concave shell has a peripheral edge that is coupled with the rear surface of the passenger support. A conduit member has an intake opening between the passenger support and the shell. An air chamber is coupled with an exhaust opening of the conduit member. The air chamber has a fan on an exterior portion of the air chamber to draw air from the back support surface through the air chamber.

According to another aspect of the present invention, a vehicle seatback assembly includes a frame structure that has a forward extending suspension component. A permeable passenger support couples with the suspension component. A shell encloses a rear surface of the passenger support to define an intake chamber. An exhaust chamber has a channel that extends to the intake chamber. The exhaust chamber draws air from a front surface of the passenger support.

According to yet another aspect of the present invention, a vehicle seatback assembly includes upper and lower trim carriers that have ventilation apertures. A permeable cushion is disposed over the trim carriers to define a back support surface. A top concave panel and a bottom concave panel couple respectively with the upper and lower trim carriers. A fan chamber has a first conduit that extends to the top concave panel and a second conduit that extends to the bottom concave panel to each draw air from the back support surface.

These and other aspects, objects, and features of the present invention will be understood and appreciated by those skilled in the art upon studying the following specification, claims, and appended drawings.

DETAILED DESCRIPTION OF THE EMBODIMENTS

Figures 1, 2:
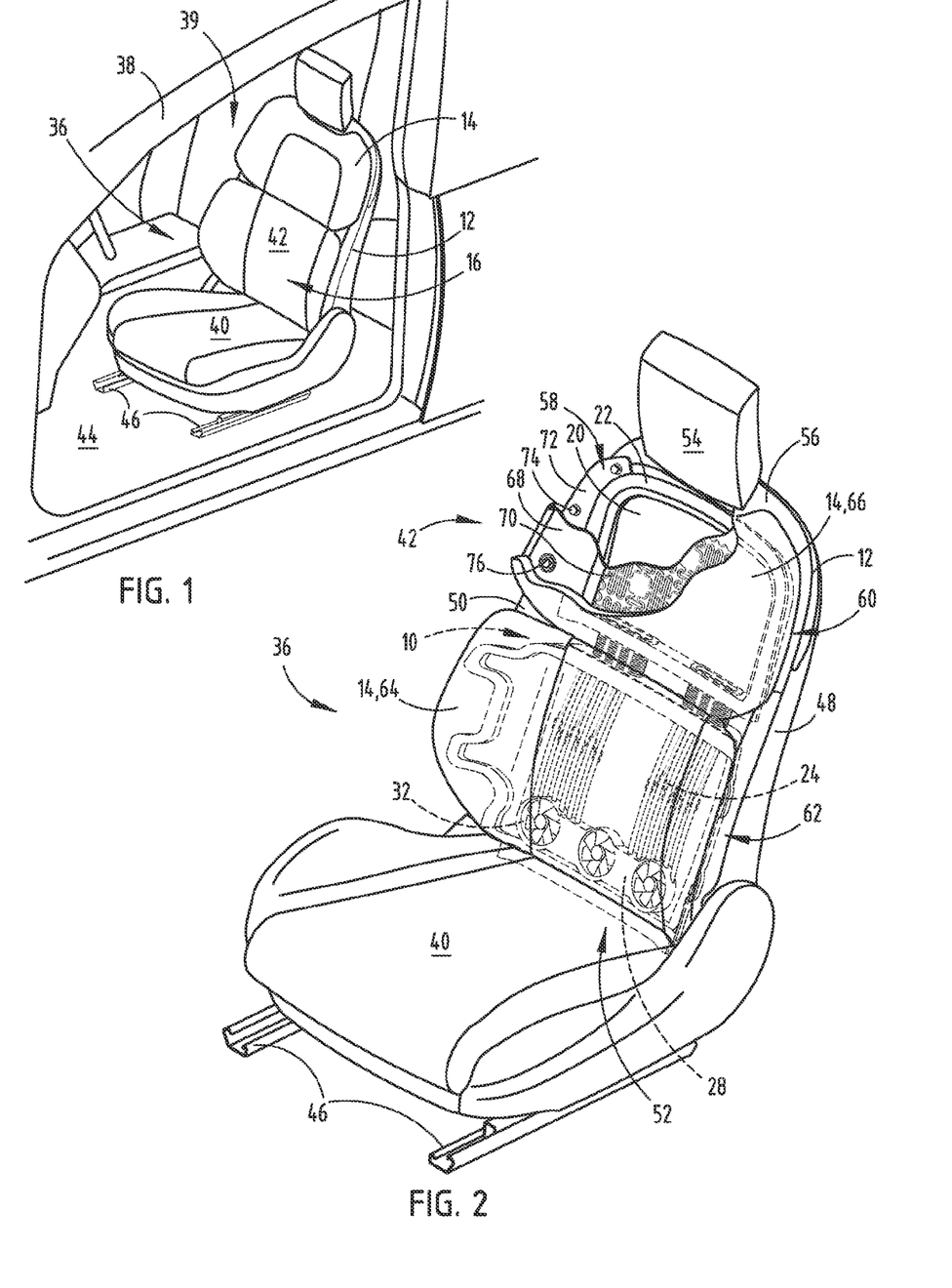
FIG. 1 is a top perspective view of a vehicle seating assembly in a vehicle.
FIG. 2 is a top perspective view of the vehicle seating assembly having a cut away portion showing an air distribution assembly.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-10, reference numeral 10 generally refers to a vehicle air distribution assembly that includes a seatback structure 12 with a permeable passenger support 14. The passenger support 14 is coupled with the seatback structure 12 and has a back support surface 16 and a rear surface 18. A concave shell 20 has a peripheral edge 22 which is coupled with the rear surface 18 of the passenger support 14. A conduit member 24 has an intake opening 26 between the passenger support 14 and the shell 20. An air chamber 28 is coupled with an exhaust opening 30 of the conduit member 24 and has a fan 32 on an exterior portion 34 of the air chamber 28 to draw air from the back support surface 16 through the air chamber 28.

Referring now to FIG. 1, a seating assembly 36 is positioned in a driver side location of a vehicle 38. The seating assembly 36 includes a seat 40 that is pivotally coupled with a vehicle seatback assembly 42 for pivotally adjusting the seatback assembly 42 between upright and reclined positions relative to the seat 40. The seat 40 is slidably coupled with a floor 44 of the vehicle 38 about a track assembly 46. The track assembly 46 is configured to allow the seating assembly 36 to be adjusted in a forward and rearward direction relative to the floor 44 of the vehicle 38. It is understood that the seating assembly 36 may be located in various locations throughout the vehicle 38 other than the illustrated location, such as a passenger side location, a mid-row location, and a rear seat location. It is also conceivable that the seat 40 may not include the reclining feature and may not include the track assembly 46, such that the seat 40 may be fixedly or alternatively coupled with the floor 44 of the vehicle 38.

As illustrated in FIG. 2, the seatback assembly 42 includes the seatback structure 12 having a first side support 48 and a second side support 50, each pivotally coupling with a rear portion 52 of the seat. A headrest 54 is coupled with and supported by a top support 56 of the seatback structure 12 and positioned centrally between the first and second side supports 48, 50. However, it is contemplated that the headrest 54 may be integrated with the top support 56, included as part of the passenger support, or that the headrest 54 may not otherwise be included on the seatback assembly 42.

As further shown in FIG. 2, a suspension assembly 58 extends forward from the seatback structure 12 to engage the passenger support 14. The suspension assembly 58 includes an upper suspension component 60 and a lower suspension component 62. The lower suspension component 62 is statically coupled with the lower portion of the seatback structure 12 and extends forward to couple with a lower segment 64 of the passenger support 14 for supporting a seated occupant's lower back. The upper suspension component 60 is pivotally coupled between the first and second side supports 48, 50 and extends forward to couple with an lower segment 64 of the passenger support, similarly, for supporting a seated occupant's upper back. The passenger support 14 includes a molded trim carrier 68 having a plurality of ventilation apertures 70 extending to the rear surface 18 of the passenger support. The suspension components include outwardly extending flexible members 72 that operably couple with an edge portion of the trim carrier 68. More specifically, a connection feature 74 on a distal end of the flexible members 72 detachably couples with engagement apertures 76 on the trim carrier 68. As shown in FIG. 2, the shell portion 20 of the air distribution assembly 10 is coupled with the rear surface 18 of the passenger support 14 to enclose the ventilation apertures 70 on the trim carrier 68. As such, the air distribution assembly 10 is generally located between the passenger support 14 and the suspension assembly 58. However, portions of the air distribution assembly 10 may otherwise be included rearward or integral with the suspension assembly 58 and the passenger support 14.

Figures 3, 4:
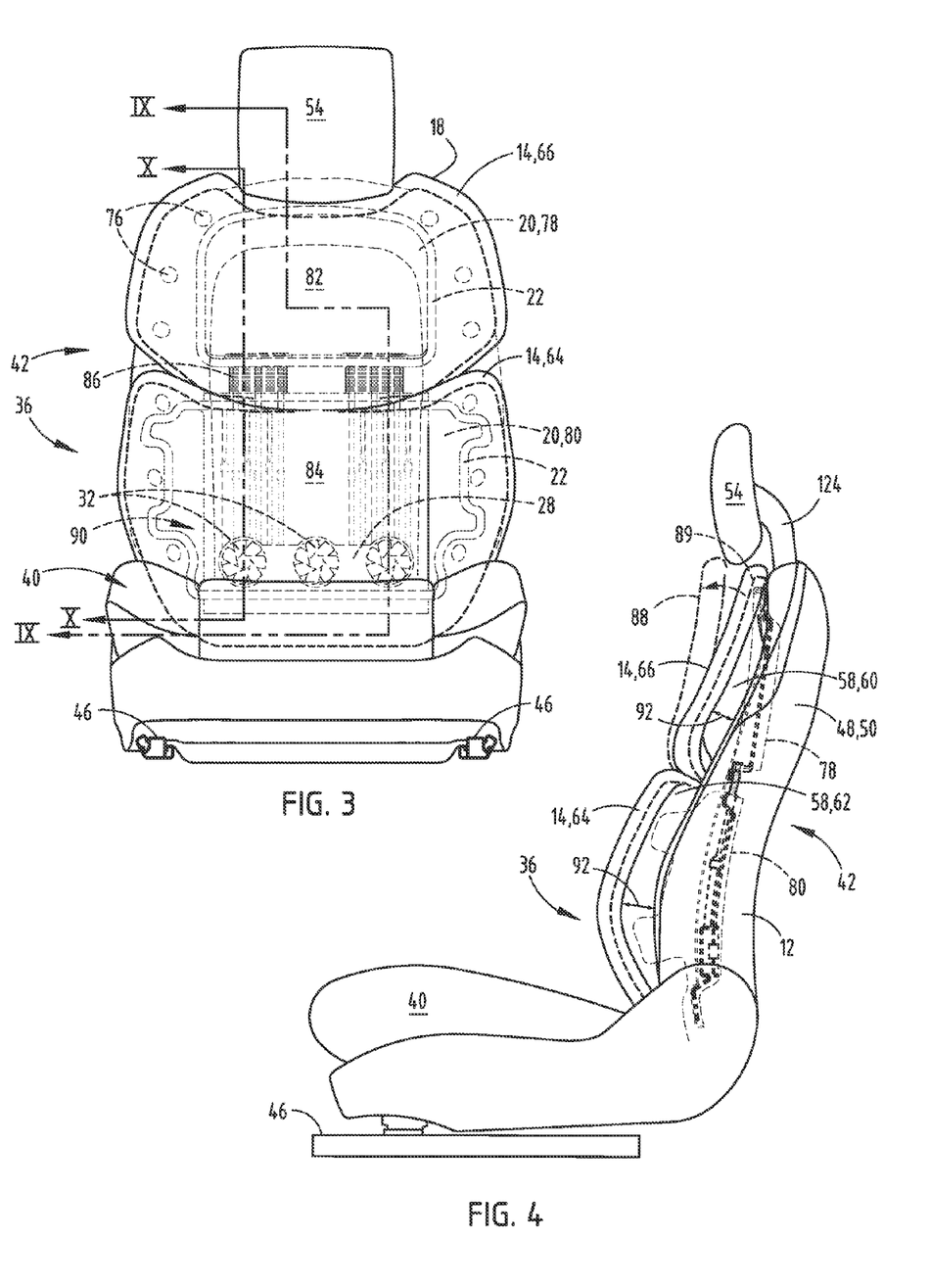
FIG. 3 is a front elevational view of the vehicle seating assembly.
FIG. 4 is a side elevational view of the vehicle seating assembly.

The shell portion 20 of the air distribution assembly, as illustrated in FIG. 3, includes a top concave shell 78 and a bottom concave shell 80 coupled, respectively, with the upper and lower segments 66, 64 of the passenger support 14. A peripheral edge 22 of the top and bottom concave shells 78, 80 couple with the rear surface 18 of the passenger support 14 to define an upper cavity 82 and a lower cavity 84 between the passenger support 14 and the shell portion 20 of the air distribution assembly 10. A flexible duct portion 86 extends between the top and bottom concave shells 78, 80. The flexible duct portion 86 is provided to permit the upper segment 66 of the passenger support 14 and the upper suspension component 60 (FIG. 5) to pivot relative to the lower segment 64 of the passenger support, whereby the flexible duct portion 86 curves and flexes when the upper suspension component 60 pivots between a forward position 88 and a rearward position 89 (FIG. 4). A lower region 90 of the bottom concave shell 80 includes the air chamber 28 with the fans 32, adjacent to the pivotal connection between the seatback assembly 42 and the seat 40. The air chamber 28 is configured to ventilate the back support surface 16, as described in more detail below.

As shown in FIG. 4, the suspension assembly 58 extends forward to suspend the passenger support 14 away from the seatback structure 12 and to define an external peripheral gap 92 between the first and second side supports 48, 50 and the passenger support 14. The external peripheral gap 92 may be compressed proximate a rearward force acting on the passenger support 14 that elastically deforms one or more of the flexible members 72 supporting the passenger support 14. As such, the upper suspension component 60 and the lower suspension component 62 are independently flexible under the weight of an occupant. In addition, upon pivotal movement of the upper suspension component 60 to the forward position 88, the peripheral gap 92 proximate the upper segment 66 of the passenger support 14 is enlarged. Accordingly, the top concave shell 78 moves in conjunction with the upper suspension component's 60 pivotal transitions between the forward and rearward positions 88, 89, maintaining engagement with the rear surface 18 of the passenger support 14. It is conceivable that more or fewer suspension components may be included as part of the seatback suspension assembly 58. Further it is contemplated that the passenger support 14 may include alternative shapes or orientations that detachably couple with the suspension assembly 58.

Figure 5:
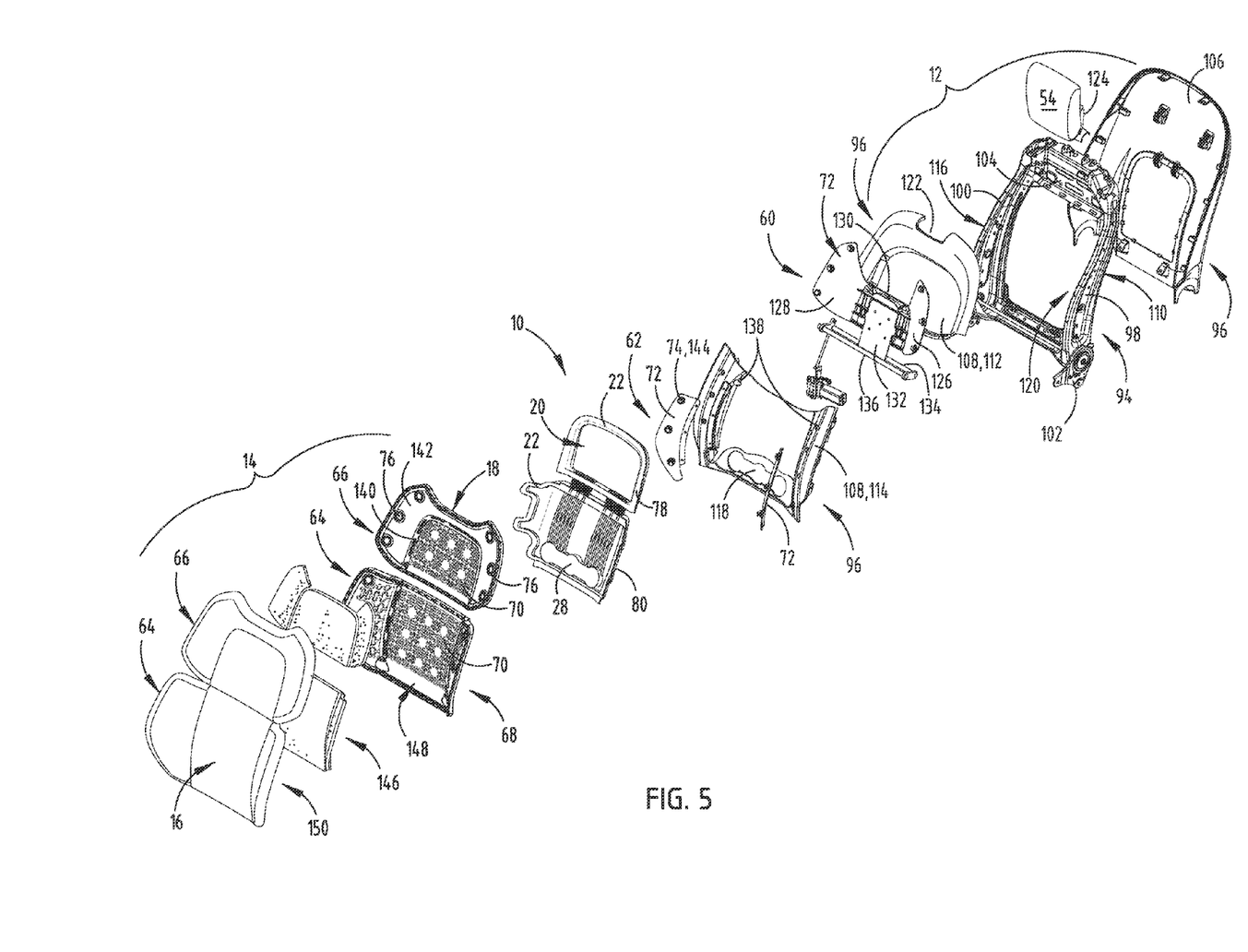
FIG. 5 is an exploded top perspective view of a seatback assembly of the vehicle seating assembly.

Referring now to the embodiment illustrated in FIG. 5, the seatback structure 12 includes an internal frame 94 and a trim shroud 96 configured to substantially enclose the internal frame 94. The internal frame 94 has a first side member 98 and a second side member 100 extending upward from a pivotal connection with recliner brackets 102 that couple with the seat 40 (FIG. 4). The first and second side members 98, 100 are substantially parallel with each other and curve upward and rearward from the recliner brackets 102 to provide a curved shape that is substantially similar to an occupant's spinal column. Further, the side members 98, 100 are more robust proximate the recliner brackets 102 and taper as they extend upward to couple with a top member 104 that extends orthogonally between the first and second side members 98, 100. Accordingly, the first and second side supports 48, 50 (FIG. 2) of the seatback structure 12 include the first and second side members 98, 100, respectively, and the top support 56 (FIG. 2) of the seatback structure 12 includes the top member 104 of the internal frame 94. It is conceivable that the internal frame 94 or portions thereof may be integrated with the trim shroud 96 or portions of the suspension assembly 58.

As shown in FIG. 5, the trim shroud 96 includes a rear trim panel 106 and a front trim panel 108. The rear trim panel 106 couples with the internal frame 94 to substantially enclose a rear portion 110 of the seatback structure 12. The front trim panel 108 has an upper piece 112 and a lower piece 114 that each couple with the internal frame 94 to enclose a front portion 116 of the seatback structure 12. The lower piece 114 of the front trim panel 108 couples with the internal frame 94, allowing two flex members 72 to couple with the sides of the lower piece 114 proximate the first and second side members 98, 100 of the internal frame 94. As such, the lower piece 114 of the front trim panel 108 is coupled between the internal frame 94 and the flex members 72 of the lower suspension component 62. In addition, the lower piece 114 includes a bottom vent 118 centrally aligned with the air chamber 28 of the air distribution assembly 10. The upper piece 112 of the front trim panel 108 similarly couples with the internal frame 94 proximate the top member 104 and the side members 98, 100. In addition, the upper piece 112 engages the lower piece 114 of the front trim panel 108 at an intermediate area 120 of the seatback structure. The upper piece 112 also includes a mounting cutaway 122 proximate the central portion of the top member 104 for receiving a support post 124 of the headrest 54. The trim shroud 96 is typically molded with polymer material and the internal frame 94 is typically constructed of a rigid metal such as steel, aluminum, or other substantially rigid metals. It is conceivable that alternative materials or forming methods may be used for the trim shroud 96 and the internal frame 94.

Still with reference to FIG. 5, the upper suspension component 60, positioned proximate the upper piece 112 of the front trim panel 108, includes a first flex member 126, a second flex member 128, and a central body 130 disposed there between. The central body 130 is coupled with an extension bracket 132 that protrudes down between the upper and lower pieces 112, 114 of the front trim panel 108 to rigidly couple with a support bar 134. The support bar 134 extends laterally between the first and second side supports 48, 50 of the seatback structure 12 in parallel alignment with and rearward a pivot bar 136 that pivotally couples with the first and second side supports 48, 50. The pivot bar 136 extends laterally across the front of the lower piece 114 of the front trim panel 108 and through rotation apertures 138 therein, allowing the distal ends of the pivot bar 136 to reside rearward the front trim panel 108. The support bar 134 couples with the distal ends of the pivot bar 136, such that the upper suspension component 60 pivots between the forward and rearward positions 88, 89 (FIG. 4) about the pivot bar 136. It is contemplated that the extension bracket 132 may couple directly with the pivot bar 136 potentially eliminating the support bar 134. It is also conceivable that the pivot bar 136 and the support bar 134 may be alternatively shaped or arranged to provide a lateral axis to pivot the upper suspension component 60 forward and rearward.

The passenger support 14, as illustrated in FIG. 5, includes the trim carrier 68 having an open matrix 140 of the ventilation apertures 70 that defines a pattern of resilient elements configured to support the weight of an occupant. The peripheral edge 22 of the top and bottom concave shells 78, 80 engages the trim carrier 68 to surround the ventilation apertures 70 in a substantially airtight seal, such that the concave shells 78, 80 capture any air that passes through the ventilation apertures 70. The edge portion of the upper and lower segments 66, 64 proximate angled side bolsters 142 of the passenger support 14, operably couple, respectively, with the upper and lower suspension components 60, 62 in a friction-fit connection. The friction-fit connection is formed between the connection feature 74 on the distal ends of the flexible members 72 and the engagement apertures 76 on the edge portion of the trim carrier 68. The connection feature 74 includes a protrusion 144 that is configured to be inserted and frictionally retained in a keyhole slot of the engagement aperture 76. Also, the angled side bolsters 142 are integrated with a shape of the passenger support 14 and are configured to prevent lateral movement of an occupant's back relative to the passenger support 14, such as lateral movement of an occupant caused by turning the vehicle 38 in motion.

The passenger support 14, as shown in FIG. 5, also includes an air permeable cushion 146 disposed over a forward facing surface 148 of the trim carrier 68. The cushion 146 includes a resilient structure of woven fibers that have open areas to allow ventilation; however, it is conceivable that the cushion 146 may include air permeable open cell foam, air permeable closed cell foam, or other conceivable flexible and breathable materials. A breathable cover stock 150 is disposed over the cushion 146 to provide additional support to hold the cushion 146 against the trim carrier 68. The cover stock 150 may conceivably include a fabric material, a perforated leather material, a vinyl material, or other conceivable air permeable seating upholstery materials.

Figure 6:
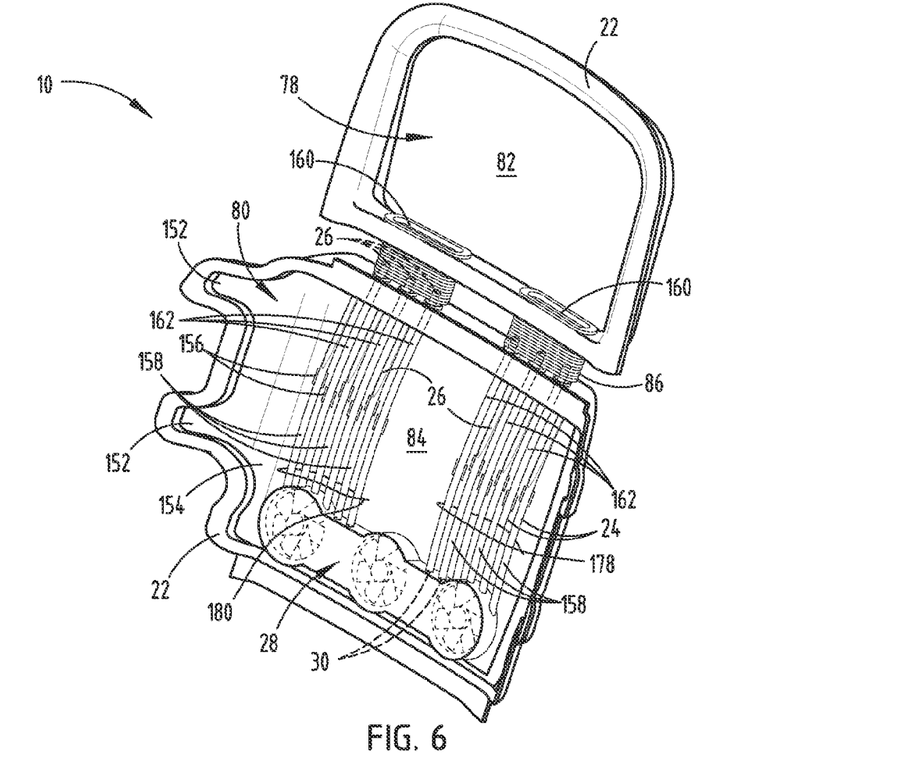
FIG. 6 is a front perspective view of the air distribution assembly.
Figure 7:
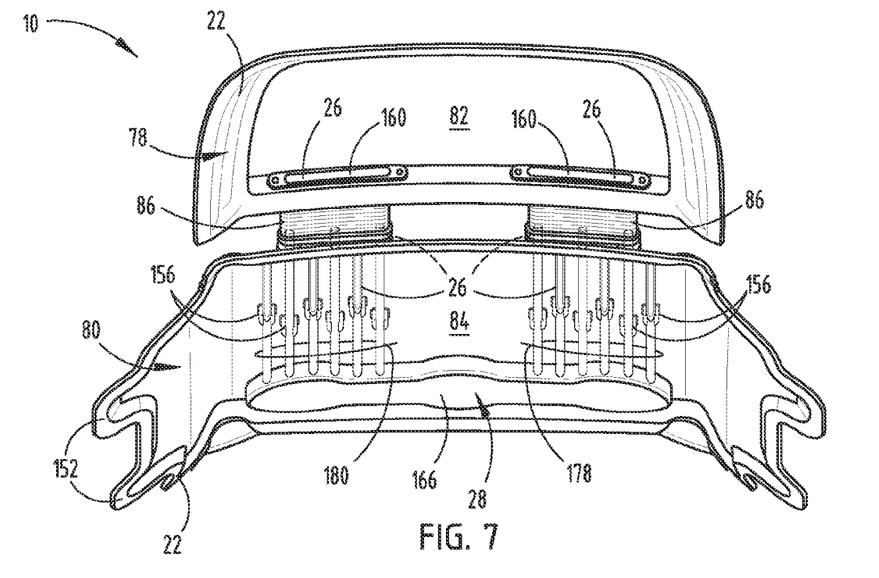
FIG. 7 is a top perspective view of the air distribution assembly.

Referring now to FIGS. 6-7, the air distribution assembly 10 includes the top and bottom concave shells 78, 80 that have the upper cavity 82 and lower cavity 84 facing forward to couple, respectively, with the rear surface 18 of the upper and lower segments 66, 64 of the passenger support 14 (FIG. 5). The lower cavity 84 of bottom concave shell 80 includes outer extremity portions 152 that align with the ventilation apertures 70 on the angled side bolsters 142 of the trim carrier 68 of the lower segment 64. A number of conduit members 24 extend longitudinally within the lower cavity 84 of the bottom concave shell 80. The conduit members 24 extend upward from the air chamber 28 and are attached to an interior surface 154 of the bottom concave shell 80. More specifically, connection elements 156 protrude forward from the interior surface 154 to detachably couple with an intermediate portion of the conduit members 24.

As shown in FIGS. 6-7, a first set 158 of conduit members 24 includes three conduit members 24 on both lateral sides of the air distribution assembly 10. The first set 158 of conduit members 24 each have the intake opening 26 within the lower cavity 84 of the bottom concave shell 80 that is directed forward, toward the rear surface 18 of the passenger support (FIG. 5). The intake openings 26 on the first set 158 of conduit members 24 include an elliptical shape to enlarge the volume of air that may be received into a tubular channel 160 that extends within each conduit member 24. The channel 160 extends within the first set 158 of conduit members 24 from the intake opening 26 at the upper end to the exhaust opening 30 and the lower end. The exhaust openings 30 are coupled with the air chamber 28.

As also illustrated in FIG. 6-7, a second set 162 of conduit members 24, having three individual conduit members 24 on both lateral sides of the air distribution assembly 10, extend longitudinally along the interior surface 154 of the bottom concave shell 80 to couple with the upper cavity 82 of the top concave shell 78. The intake openings 26 of the second set 162 of conduit members 24 couple with the flexible duct portion 86 of the conduit members 24 that extends between the lower cavity 84 and the upper cavity 82. The flexible duct portion 86 includes an ovular cross-sectional shape that is configured to similarly enlarge the volume of air that may be received into the channels 160 extending within the second conduit members 24. The flexible duct portion 86 includes corrugated features 164 along the longitudinal extent of the duct portion 86 to increase the flexible range of the top concave shell 78 upon pivotal movement of the upper suspension component 60 (FIG. 4). It is contemplated that the conduit members 24 and channels 160 extending therein may be integrally formed with the concave shells 78, 80 to eliminate the connecting elements 156 and provide a similar airflow arrangement to the air chamber 28.

Figure 8:
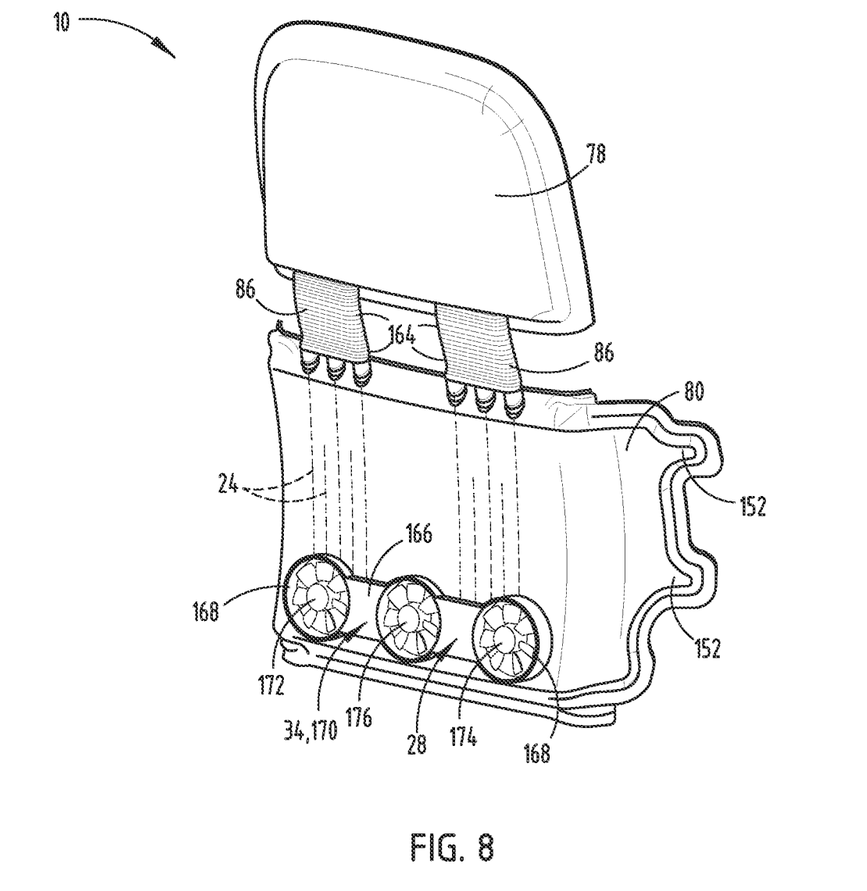
FIG. 8 is a rear perspective view of the air distribution assembly.

As shown in FIG. 8, the bottom concave shell 80 includes a housing 166 that surrounds the air chamber 28. The air chamber 28 has three fans 32 coupled with the exterior portion 34 of the housing 166. More specifically, the housing 166 of the air chamber 28 extends partially through the bottom concave shell 80 to occupy the lower cavity 84 and also protrudes rearwardly from the concave shell 20. The housing 166 includes a vent opening 168 on a rearward exterior wall 170 of the housing 166 for each fan 32. The vent openings 168 have a circular shape to conform to the size and diameter of the fans 32. The fans 32 include a first side fan 172, a second side fan 174, and a central fan 176 positioned between the first and second side fans 172, 174. The first side fan 172 is arranged below a first grouping 178 of conduit members 24 that includes three conduit members 24 from each of the first and second sets 158, 162 of conduit members 24. Similarly, the second side fan 174 is arranged below a second grouping 180 of conduit members 24 that includes the remaining three conduit members 24 of each of the first and second sets 158, 162 of conduit members 24.

Figures 9, 10:
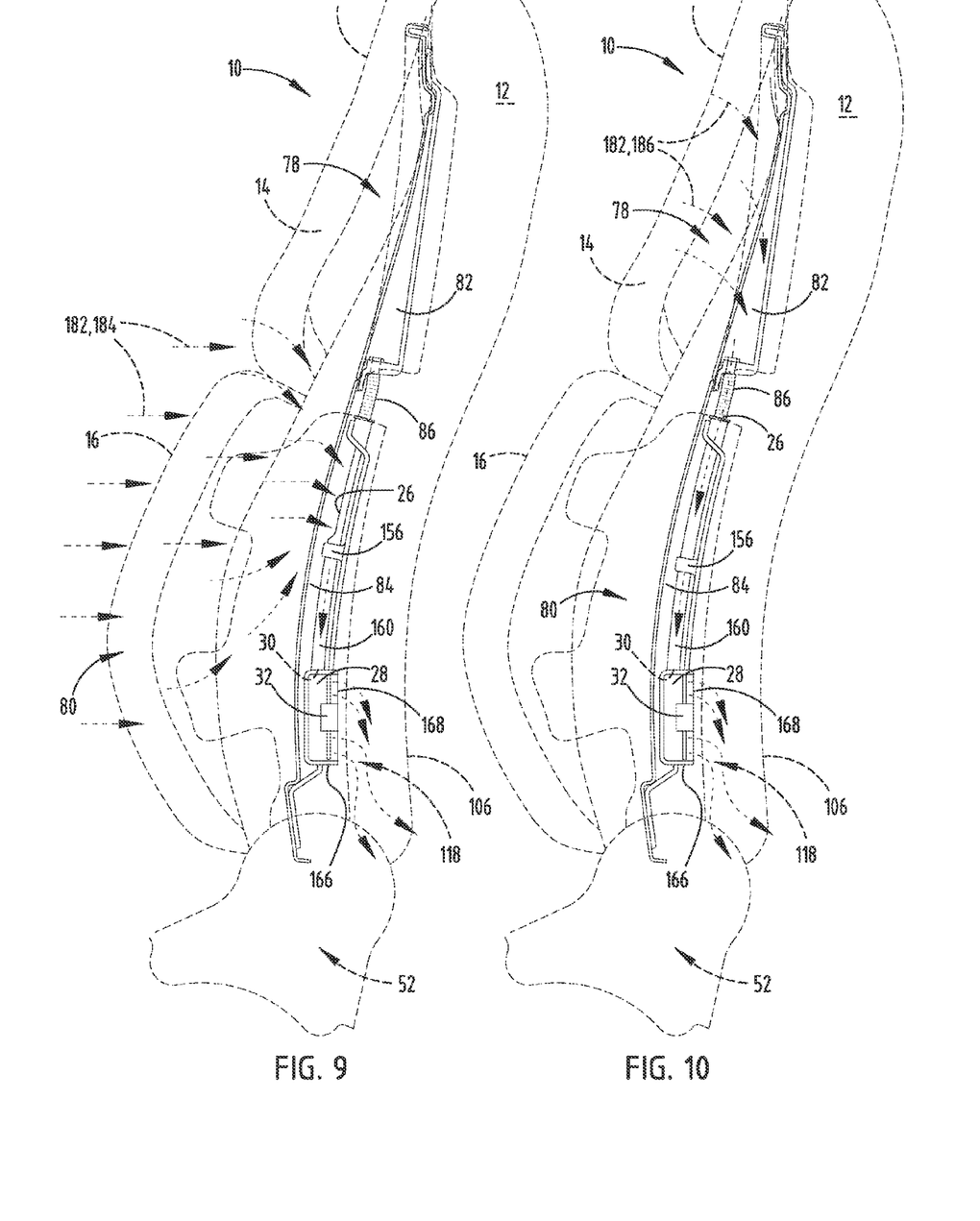
FIG. 9 is a side cross-sectional view of the seatback assembly taken at line IX-IX of FIG. 3, showing an airflow proximate a lower trim carrier of the seatback assembly.
FIG. 10 is a side cross-sectional view of the seatback assembly taken at line X-X of FIG. 3, showing an airflow proximate an upper trim carrier of the seatback assembly.

Referring now to FIGS. 9-10, in operation of the air distribution assembly 10, the fans 32 in the air chamber 28 operate to create a pressure drop between air chamber 28 and the tubular channels 160 within the conduit members 24. This pressure drop creates an intake air flow 182 from the back support surface 16 of the passenger support, drawing air through the cover stock 150 material, the permeable cushion 146, and the trim carrier 68, thereby leading the airflow into the upper and lower air intake cavities 82, 84. However, the fans 32 are configured to draw or push air through the channels 160. When the air is drawn through the channels 160 of the conduit members 24 from the upper and lower intake cavities, the pressure drop is greater than when the air is pushed through the channels 160, given a similar rotation speed of the fans 32. To push air through the channels 160 to the back support surface 16 the fans 32 operate in a reverse direction to create an opposite airflow and create a cooling or heating effect depending on the temperature of the air pushed to the back surface.

As shown in FIG. 9, air is drawn from the lower intake cavity into the elliptical intake openings 26 of the first set 158 of conduit members 24, whereby the air is drawn though the channels 160 to the exhaust opening 30 within the air chamber 28. This lower intake air flow 184 creates a cooling effect at the lower back support surface 16 for a seated occupant, as heat is withdrawn and perspiration is wicked away from the occupant and drawn into the passenger support 14. As similarly shown in FIG. 10, air drawn from the upper intake cavity 82 through the flexible duct portion 86 and into the intake openings 26 of the second set 162 of conduit members 24. This air is drawn down through the channels 160 along the lower cavity 84 to the exhaust opening 30 within the air chamber 28. Similar to the lower intake air flow 184, this upper intake air flow 186 creates a cooling effect at the upper back support surface 16 for a seated occupant.

The upper and lower intake air flows 186, 184, as illustrated in FIGS. 9-10, exit the air chamber 28 through the fan 32 and the vent opening 168 on the rear wall of the housing 166 to dispense through the bottom vent 118 on the lower piece 114 of the front trim panel 108 (FIG. 5). Before exiting the seatback structure 12 to a cabin area 39 of the vehicle 38 (FIG. 1), the exhaust air is urged downward by the rear trim panel 106 of the seatback structure 12 to a lower area of the rear trim panel 106 proximate the pivotal connection with the rear portion 52 of the seat 40. It is contemplated that the rear trim panel 106 may include ventilation openings or duct passages to alternatively direct the airflow exhausting from the air distribution assembly 10. For instance, duct passages may be configured to distribute the air upward in the seatback structure 12 to ventilation openings proximate the upper suspension component 60 or the headrest 54, whereby the air would be released rearward. Such a configuration may supply an airflow to a passenger seat 40 rearward the seating assembly 36. Also, it is contemplated that the seating assembly 36 many include duct passages to distribute the exhaust air flow to the vehicle duct system and/or exterior to the vehicle 38.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle air distribution assembly comprising:
   a seatback structure;
   a permeable passenger support coupled with the seatback structure, the passenger support having a back support surface and a rear surface;
   a concave shell having a peripheral edge coupled with the rear surface of the passenger support;
   a tubular conduit member having an intake opening between the passenger support and the shell and an exhaust opening;
   an air chamber coupled with the exhaust opening of the conduit member and having a fan on an exterior portion of the air chamber to draw air from the back support surface through the air chamber; and
   a hard back panel disposed behind and covering rear portions of the concave shell the fan.

2. The vehicle air distribution assembly of claim 1, wherein the fan operates to create a pressure drop between the air chamber and the conduit member.

3. The vehicle air distribution assembly of claim 1, further comprising:
a suspension component having flexible members extending from the seatback structure, wherein the passenger support is coupled with the flexible members to define an exterior peripheral gap between the seatback structure and the passenger support.

4. The vehicle air distribution assembly of claim 1, wherein the passenger support includes a molded trim carrier having a plurality of ventilation apertures extending to the rear surface of the passenger support.

5. The vehicle air distribution assembly of claim 1, wherein the passenger support includes an upper back support and a lower back support separate and distinct from the upper back support, and wherein the concave shell includes an upper segment and a lower segment coupled respectively with the upper and lower back supports to define an upper intake cavity and a lower intake cavity.

6. The vehicle air distribution assembly of claim 5, wherein a first conduit member extends from the air chamber to the lower intake cavity and a second conduit member separately extends from the air chamber to the lower intake cavity.

7. A vehicle seatback assembly comprising:
a permeable passenger support coupled with a suspension component;
a shell enclosing a rear surface of the passenger support to define an intake chamber in an upper portion of the seatback assembly;
a hard back panel disposed over and covering a rear portion of the shell; and
an exhaust chamber having a channel extending upwardly to the intake chamber, wherein the exhaust chamber draws air from a front surface of the passenger support.

8. The vehicle seatback assembly of claim 7, further comprising:
a fan coupled with the exhaust chamber that is configured to draw or push air through the channels.

9. The vehicle seatback assembly of claim 8, wherein the exhaust chamber includes a vent coupled with the fan to dispense air drawn to the exhaust chamber to a vehicle cabin.

10. The vehicle seatback assembly of claim 7, further comprising:
a trim back panel coupled with a rear portion of a frame structure, wherein the exhaust chamber dispenses the air drawn from the passenger support to a lower region of the back panel.

11. The vehicle seatback assembly of claim 7, further comprising:
an elongated conduit member having an intake opening coupled with the intake chamber and an exhaust opening coupled with the exhaust chamber, wherein the channel extends within the conduit member.

12. The vehicle seatback assembly of claim 11, wherein the conduit member includes a tubular portion extending in alignment with a longitudinal extent of the passenger support, and wherein the intake opening includes an elliptical shape.

13. The vehicle seatback assembly of claim 7, wherein the passenger support includes a molded trim carrier detachably coupled with the suspension component and having a plurality of ventilation apertures.

14. The vehicle seatback assembly of claim 13, wherein the suspension component includes outwardly extending flexible members detachably coupled with an edge portion of the passenger support.

15. A vehicle seatback assembly comprising:
upper and lower trim carriers having ventilation apertures;
a permeable cushion disposed over the trim carriers;
top and bottom concave panels coupled respectively with the upper and lower trim carriers;
a hard back panel positioned behind and extending over portions of both the top and bottom concave panels; and
a fan chamber having a first conduit extending to the top concave panel and a second conduit extending to the bottom concave panel to move air proximate a back support surface.

16. The vehicle seatback assembly of claim 15, further comprising:
a fan coupled with the fan chamber to draw air through the ventilation apertures.

17. The vehicle seatback assembly of claim 16, further comprising:
a vent opening located on a rear wall of the fan chamber and coupled with the fan to dispense air to a vehicle cabin.

18. The vehicle seatback assembly of claim 15, wherein the upper trim carrier is pivotally coupled with a seatback structure and movable between a rearward position and a forward position.

19. The vehicle seatback assembly of claim 18, wherein the second conduit includes a flexible duct portion extending between the top and bottom concave panels for flexing when the upper trim carrier pivots to the forward position.

20. The vehicle seatback assembly of claim 15, wherein the fan chamber is adjacent to a lower region of the bottom concave panel and is configured to draw heat away from the back support surface to provide a cooling effect.

* * * * *